(12) United States Patent
Lin et al.

(10) Patent No.: US 11,194,365 B2
(45) Date of Patent: Dec. 7, 2021

(54) HINGE MODULE AND ELECTRONIC DEVICE

(71) Applicants: Che-Hsien Lin, Taipei (TW); Che-Hsien Chu, Taipei (TW); Chun-An Shen, Taipei (TW)

(72) Inventors: Che-Hsien Lin, Taipei (TW); Che-Hsien Chu, Taipei (TW); Chun-An Shen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 55 days.

(21) Appl. No.: 16/561,019

(22) Filed: Sep. 5, 2019

(65) Prior Publication Data

US 2020/0081501 A1 Mar. 12, 2020

Related U.S. Application Data

(60) Provisional application No. 62/728,064, filed on Sep. 6, 2018.

(51) Int. Cl.
*E05D 7/00* (2006.01)
*G06F 1/16* (2006.01)
*E05D 11/08* (2006.01)

(52) U.S. Cl.
CPC .......... *G06F 1/1681* (2013.01); *E05D 11/082* (2013.01); *E05Y 2900/606* (2013.01)

(58) Field of Classification Search
CPC ............................. G06F 1/1681; E05D 11/082
See application file for complete search history.

(56) References Cited

U.S. PATENT DOCUMENTS 7,414,834 B2 * 8/2008 Ukonaho ............... H04M 1/022
16/354
8,474,101 B2 * 7/2013 Wang .................... G06F 1/1681
16/366

(Continued)

FOREIGN PATENT DOCUMENTS

CN  202484068   10/2012
CN  206958078   2/2018

(Continued)

OTHER PUBLICATIONS

"Office Action of Taiwan Counterpart Application", dated Apr. 22, 2020, p. 1-p. 11.

(Continued)

*Primary Examiner* — Jason W San
(74) *Attorney, Agent, or Firm* — JCIPRNET

(57) ABSTRACT

A hinge module includes the two spindles, the two brackets, a gear set and a torque part. The two spindles are spaced apart from each other. The two brackets are respectively connected to a first side of the two spindles, where an installing direction of each of the brackets is perpendicular to an axial direction of each of the spindles. The gear set is disposed at a second side opposite to the first side of the two spindles. The torque part is disposed on the two spindles and is located between the two brackets and the gear set, where each of the brackets is adapted to rotate relative to the torque part with the corresponding spindle, and the gear set is configured to drive the two spindles rotating in opposite directions.

16 Claims, 7 Drawing Sheets

(56) References Cited

U.S. PATENT DOCUMENTS

| | | | | |
|---|---|---|---|---|
| 8,522,401 B2* | 9/2013 | Jin | ................. | H04M 1/022 |
| | | | | 16/354 |
| 8,578,561 B2* | 11/2013 | Chuang | ................. | G06F 1/1681 |
| | | | | 16/354 |
| 2011/0157780 A1* | 6/2011 | Wang | ................. | G06F 1/1681 |
| | | | | 361/679.01 |
| 2011/0271486 A1* | 11/2011 | Wang | ................. | G06F 1/1681 |
| | | | | 16/319 |
| 2013/0014346 A1* | 1/2013 | Ahn | ................. | G06F 1/1681 |
| | | | | 16/354 |
| 2013/0016489 A1* | 1/2013 | Yeh | ................. | H04M 1/022 |
| | | | | 361/807 |
| 2013/0139355 A1* | 6/2013 | Lee | ................. | H04M 1/022 |
| | | | | 16/354 |
| 2013/0152342 A1* | 6/2013 | Ahn | ................. | F16C 11/04 |
| | | | | 16/354 |
| 2015/0267450 A1* | 9/2015 | Chiang | ................. | G06F 1/1681 |
| | | | | 16/354 |
| 2015/0342068 A1* | 11/2015 | Su | ................. | H04M 1/022 |
| | | | | 16/354 |
| 2016/0048174 A1* | 2/2016 | Hsu | ................. | G06F 1/1681 |
| | | | | 16/342 |
| 2016/0097227 A1* | 4/2016 | Hsu | ................. | F16B 1/00 |
| | | | | 16/354 |
| 2016/0187934 A1* | 6/2016 | Lee | ................. | G06F 1/1681 |
| | | | | 361/679.56 |
| 2017/0328102 A1* | 11/2017 | Kato | ................. | G06F 1/1681 |
| 2019/0204878 A1* | 7/2019 | Lin | ................. | E05D 5/10 |
| 2019/0250675 A1* | 8/2019 | Lin | ................. | E05D 11/0054 |
| 2020/0063476 A1* | 2/2020 | Lin | ................. | E05D 3/122 |
| 2020/0080357 A1* | 3/2020 | Lin | ................. | G06F 1/1641 |
| 2020/0081501 A1* | 3/2020 | Lin | ................. | E05D 11/082 |
| 2020/0257341 A1* | 8/2020 | Lin | ................. | G06F 1/1681 |

FOREIGN PATENT DOCUMENTS

| | | |
|---|---|---|
| TW | M388823 | 9/2010 |
| TW | 201324091 | 6/2013 |
| TW | M547817 | 8/2017 |

OTHER PUBLICATIONS

"Office Action of China Counterpart Application", dated Apr. 14, 2021, p. 1-p. 8.

* cited by examiner

HINGE MODULE AND ELECTRONIC DEVICE

CROSS-REFERENCE TO RELATED APPLICATION

This application claims the priority benefit of U.S. provisional application Ser. No. 62/728,064, filed on Sep. 6, 2018. The entirety of the above-mentioned patent application is hereby incorporated by reference herein and made a part of specification.

BACKGROUND OF THE INVENTION

1. Field of the Invention

The present invention relates to a hinge module and an electronic device, and in particular, to a hinge module capable of distributing an external force and an electronic device using same.

2. Description of Related Art

Generally, a hinge module is disposed between a main body and a display body in a notebook computer, so that the main body and the display body may be unfolded or closed through the hinge module. An existing hinge module includes a bearing portion, a gear portion and a torque portion. The bearing portion is configured to connect the main body and the display body, and the gear portion is configured to drive the bearing portion to move toward or away from the gear portion. The torque portion provides torque required by the bearing portion, thereby adjusting and securing the main body and the display body at any angle, allowing the user to freely adjust the unfolding and closing angle according to requirements in use.

However, the gear portion of the existing the hinge module is usually neighboring to the bearing portion. When the notebook computer or the hinge module collides with the ground or is impacted by another external force, most of the external force directly acts upon the gear portion, easily causing damage or even breakage of the gear portion. In addition, the existing hinge module is large in size, which makes it conducive to the lightweight and thin design of the notebook computer. Therefore, it is necessary to develop a hinge module that improve the problems of the gear portion is easily damaged and the large size.

SUMMARY OF THE INVENTION

The present invention provides a hinge module and an electronic device. When the hinge module or the electronic device is impacted by an external force, the hinge module and the electronic device are adapted to distribute the external force acting upon the hinge module, thereby preventing the hinge module from being damaged or broken.

The hinge module of the present invention includes: two spindles, two brackets, a gear set and a torque part. The two spindles are spaced apart from each other. The two brackets are respectively connected to a first side of the two spindles, where an installing direction of each of the brackets is perpendicular to an axial direction of each of the spindles. The gear set is disposed at a second side opposite to the first side of the two spindles. The torque part is disposed on the two spindles and is located between the two brackets and the gear set. Each of the brackets is adapted to rotate relative to the torque part with the corresponding spindle, and the gear set is configured to drive the two spindles rotating in opposite directions.

The electronic device of the present invention includes two bodies and at least one the hinge module. The at least one hinge module is disposed between the two bodies and includes: two spindles, two brackets, a gear set and a torque part. The two spindles are spaced apart from each other. The two brackets are respectively connected to a first side of the two spindles, where an installing direction of each of the brackets is perpendicular to an axial direction of each of the spindles. The gear set is disposed at a second side opposite to the first side of the two spindles. The torque part is disposed on the two spindles and is located between the brackets and the gear set. Each of the brackets is adapted to rotate relative to the torque part with the corresponding spindle, and the gear set is configured to drive the two spindles rotating in opposite directions, so that the two bodies are unfolded relative to each other or closed relative to each other.

Based on the above, the hinge module of the present invention is adapted to connect the two bodies, and in the present invention, the torque part is disposed between the gear set and the two brackets. When falling to the ground, the hinge module is impacted by an external force. Because there is a spacing between the two brackets, vibration with larger amplitude easily occurs and the impact force is transferred outward along the spindles. In this case, the torque part neighboring to the two brackets absorbs most of the impact force, and only a small portion of the impact force is transferred to the gear set, thereby preventing the gear set from being damaged or even broken.

In addition, the existing bracket is sleeved over each of the spindles and has a large structural thickness, and an installing direction of the bracket coincides with an axial direction of each of the spindles. The installing direction of each of the brackets of the present invention is perpendicular to the axial direction of each of the spindles, that is, each of the brackets is connected to each of the spindles to achieve the lightweight and thin structure.

To make the foregoing features and advantages of the present invention more comprehensible, embodiments accompanied with figures are described in detail below.

DESCRIPTION OF THE EMBODIMENTS

Figure 1A:
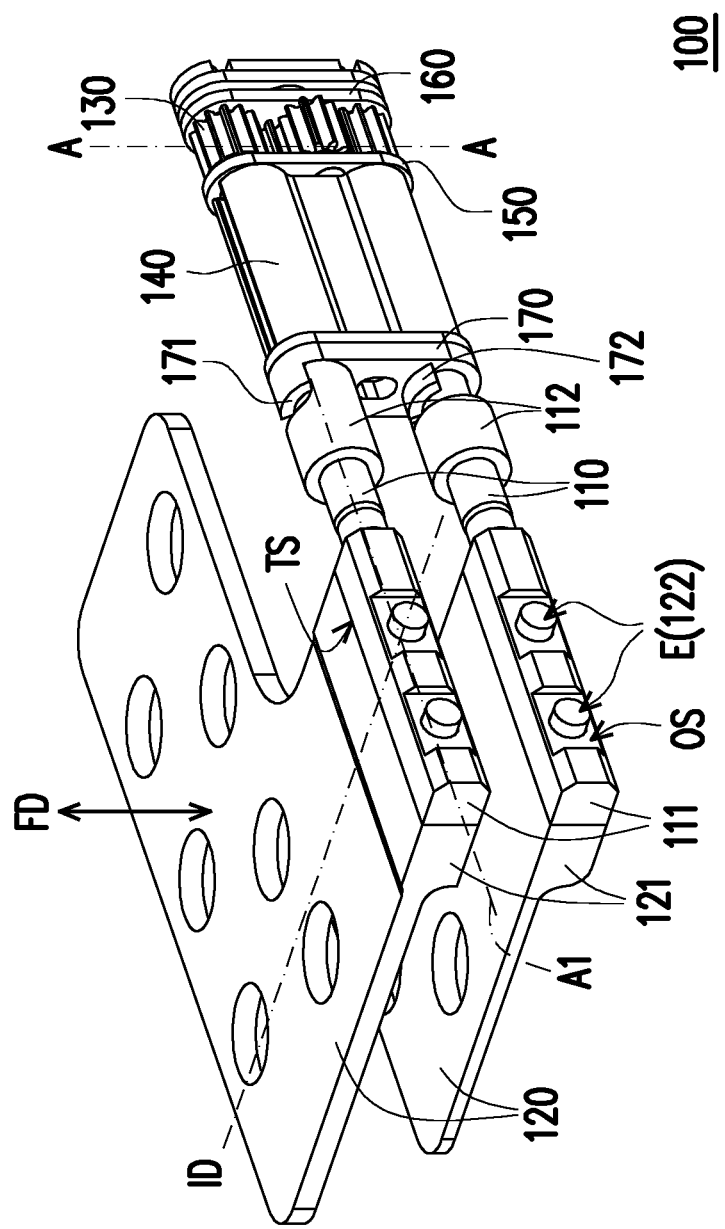
FIG. 1A is a perspective schematic diagram of a hinge module according to an embodiment of the present invention.
Figure 1B:
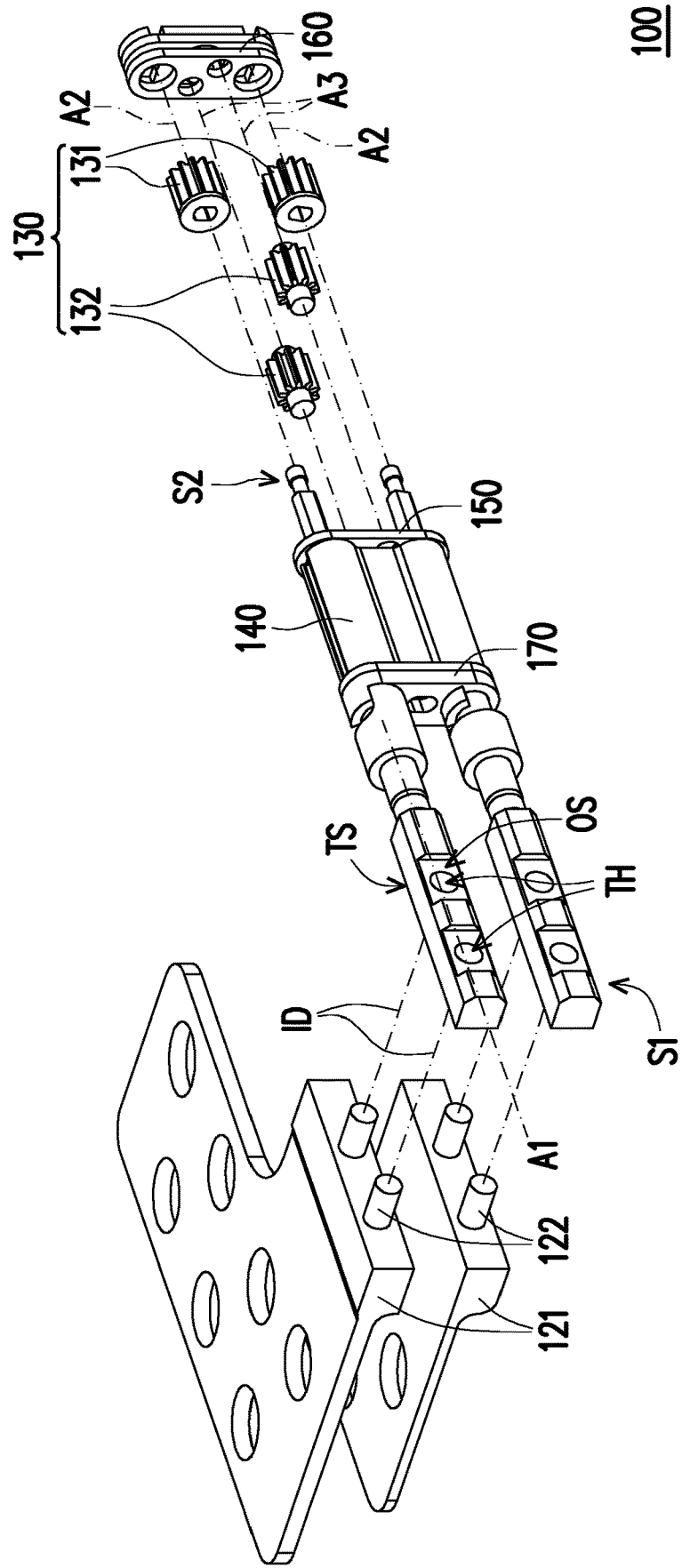
FIG. 1B is a schematic exploded view of some components of the hinge module shown in FIG. 1A.
Figure 1C:
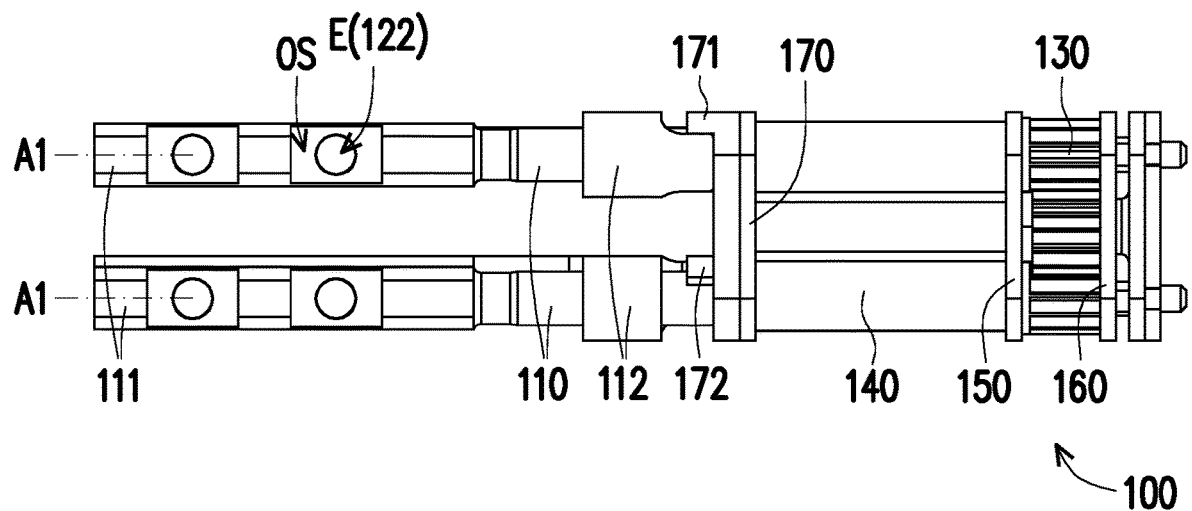
FIG. 1C is a rear view of the hinge module shown in FIG. 1A.
Figure 1D:
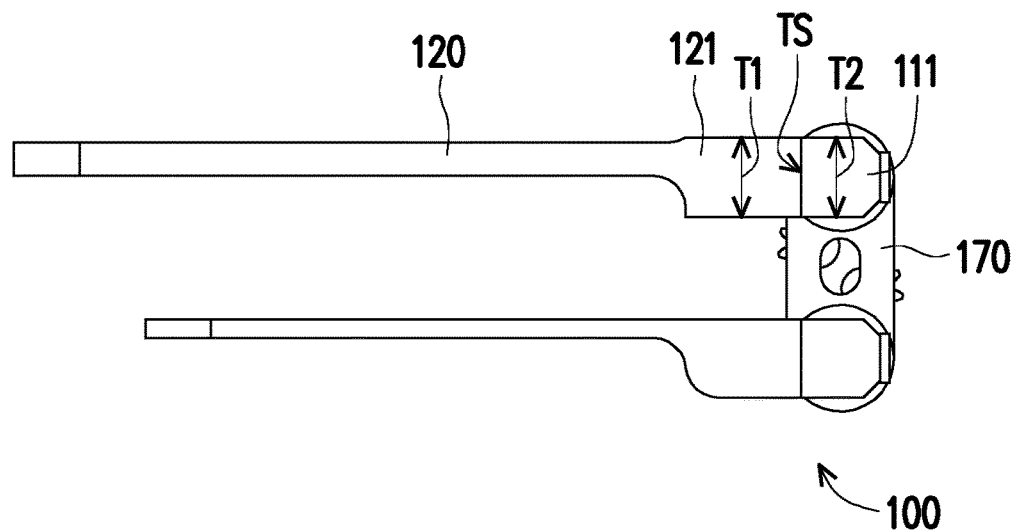
FIG. 1D is a side view of the hinge module shown in FIG. 1A.

FIG. 1A is a perspective schematic diagram of a hinge module according to an embodiment of the present invention. FIG. 1B is a schematic exploded view of some components of the hinge module shown in FIG. 1A. FIG. 1C is a rear view of the hinge module shown in FIG. 1A. FIG. 1D is a side view of the hinge module shown in FIG. 1A.

Refer to FIG. 1A to FIG. 1D. In this embodiment, a hinge module 100 includes two spindles 110, two brackets 120, a gear set 130 and a torque part 140.

The two spindles 110 are spaced apart from each other and, for example, are parallel to each other. The two brackets 120 are respectively connected to a first side S1 of the two spindles 110, where an installing direction ID of each of the brackets 120 is perpendicular to an axial direction A1 of each of the spindles 110. The gear set 130 is disposed at a second side S2 opposite to the first side S1 of the two spindles 110. The torque part 140 is disposed on the two spindles 110 and is located between the two brackets 120 and the gear set 130.

In addition, in this embodiment, the torque part 140 is disposed between the gear set 130 and the two brackets 120. When the hinge module 100 falls to the ground, the torque part 140 may first absorb most of the impact force to avoid excessive vibration of the hinge module 100. Besides, only a small portion of the impact force is transferred to the gear set 130, the small portion of the impact force is insufficient to cause structural deformation of the gear set 130, thereby preventing the gear set 130 from being damaged or even broken.

Each of the brackets 120 is adapted to rotate relative to the torque part 140 with the corresponding spindle 110, and torque is generated by friction contact between the spindles 110 and the torque part 140. In addition, the gear set 130 is configured to drive the two spindles 110 rotating in opposite directions. For example, when one of the spindles 110 rotates anticlockwise, the other spindle 110 rotates clockwise, or when one of the spindles 110 rotate clockwise, the other spindle 110 rotates anticlockwise. Therefore, the two brackets 120 can be unfolded and closed relative to each other.

Refer to FIG. 1A to FIG. 1D. Each of the spindles 110 includes a mounting portion 111 extending away from the torque part 140, and each of the mounting portions 111 includes a contact surface TS and a plurality of riveting surfaces OS opposite to the contact surface TS. Each of the brackets 120 includes a coupling portion 121 connected to the contact surface TS of the mounting portion 111 to connect the corresponding spindle 110 and the bracket 120 together.

Further, each of the mounting portions 111 includes a plurality of through holes TH, and each of the through holes TH passes through the contact surface TS and the corresponding riveting surface OS. Each of the coupling portions 121 includes a plurality of columns 122, and the columns 122 are respectively passed through the plurality of the through holes TH and riveted to the corresponding mounting portion 111. In addition, the external force is applied to an end E of each of the columns 122 that exceeds each of the through holes TH, causing deformation of each of the ends E. A deformed end E is riveted to the corresponding riveting surface OS, so that each of the brackets 120 is fixed on each of the spindles 110.

An installing direction ID of each of the columns 122 is perpendicular to forced directions FD of the brackets 120. When the brackets 120 drive the spindles 110 rotating by the plurality of the columns 122, since the forced direction FD is perpendicular to the installing direction ID, the connections (the coupling portion 121 and the mounting portion 111) of the brackets 120 and the spindles 110 could avoid a stress concentration phenomenon during rotation of the brackets 120 and improve structural strength between the coupling portion 121 and the mounting portion 111.

Further, the coupling portion 121 of each of the brackets 120 is connected to the contact surface TS of the mounting portion 111 of each of the spindles 110. A first thickness T1 of each of the coupling portions 121 is not greater than a second thickness T2 of each of the mounting portions 111, thereby reducing the overall thickness of the hinge module 100.

Refer to FIG. 1A and FIG. 1B. The hinge module 100 further includes a first baffle plate 150 and a second baffle plate 160 sleeved over the two spindles 110 and camping the gear set 130. The first baffle plate 150 is located on a side of the gear set 130 closed to the torque part 140, and the second baffle plate 160 is located on another side of the gear set 130 opposite to the first baffle plate 150. The gear set 130 may be limited by the first baffle plate 150 and the second baffle plate 160, thereby avoiding phenomena such as deviation, sway and the like when the two spindles 110 rotate in opposite directions.

Figure 2A:
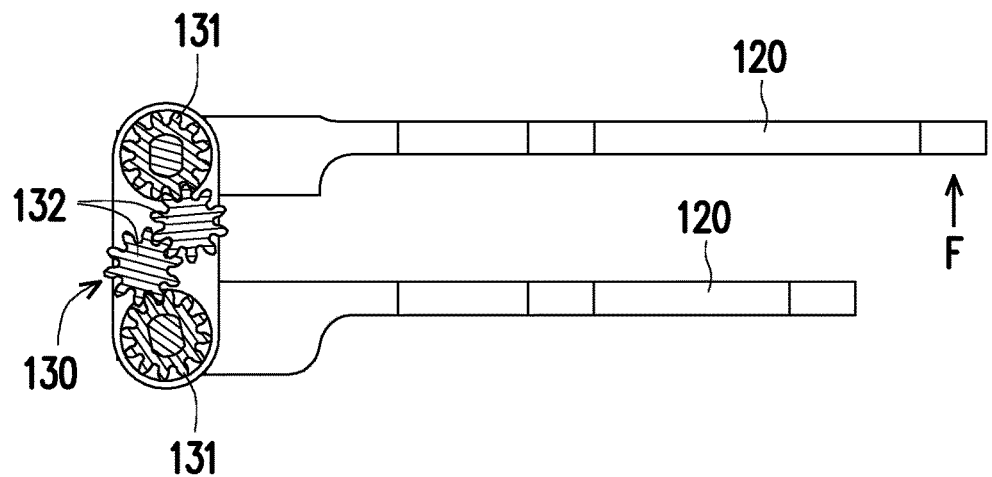
FIG. 2A is a cross-sectional schematic diagram of the hinge module shown in FIG. 1A in a closed state taken along line A-A.
Figure 2B:
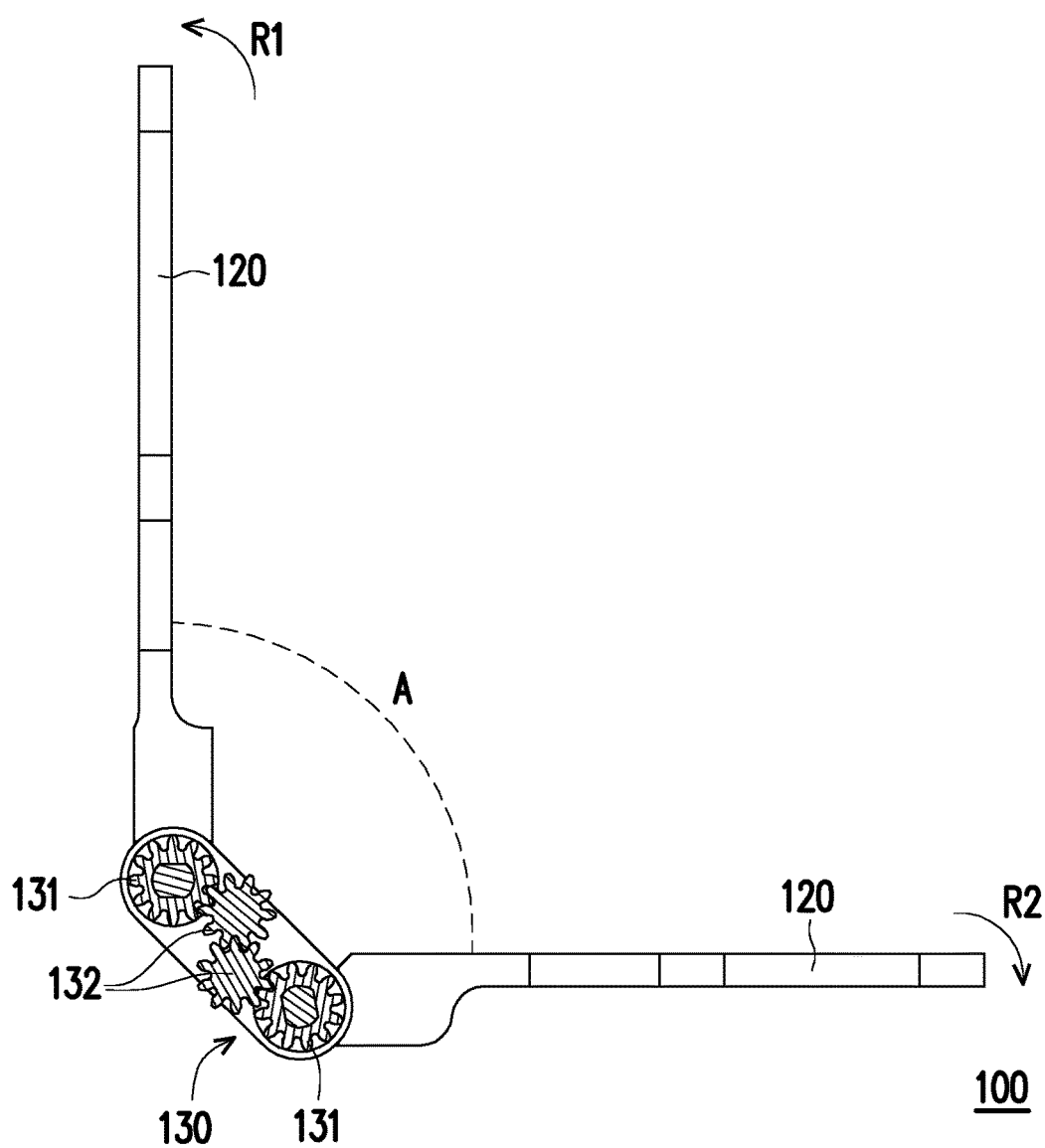
FIG. 2B is a schematic diagram of an electronic device shown in FIG. 2A unfolded at 90 degrees.
Figure 2C:
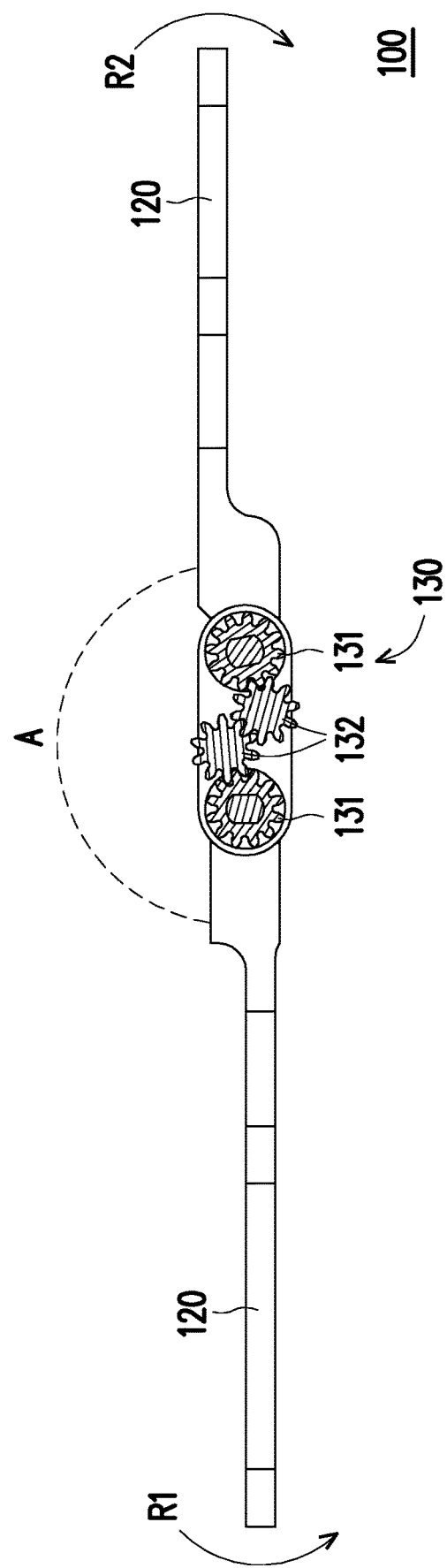
FIG. 2C is a schematic diagram of the electronic device shown in FIG. 2A unfolded at 180 degrees.

FIG. 2A is a cross-sectional schematic diagram of the hinge module shown in FIG. 1A in a closed state taken along line A-A. FIG. 2B is a schematic diagram of an electronic device shown in FIG. 2A unfolded at 90 degrees. FIG. 2C is a schematic diagram of the electronic device shown in FIG. 2A unfolded at 180 degrees.

Refer to FIG. 1A and FIG. 1B. The hinge module 100 further includes a third baffle plate 170. The third baffle plate 170 is sleeved over the two spindles 110 and includes a first stop block 171 and a second stop block 172. Each of the spindles 110 includes a positioning block 112. When the two brackets 120 are closed relative to each other (as shown in FIG. 2A, the two brackets 120 are parallel to each other), the two positioning blocks 112 of the two spindles 110 respectively abut against the first stop block 171 and the second stop block 172. When the two brackets 120 are unfolded relative to each other (that is, there is an angle A between the two brackets 120), the two positioning blocks 112 respectively separate the first stop block 171 and the second stop block 172. Further, for example, the two brackets 120 may be unfolded at 90 degrees (as shown in FIG. 2B) or at 180 degrees (as shown in FIG. 2C).

Refer to FIG. 1A, FIG. 1B and FIG. 2A, in this embodiment, the gear set 130 includes two main gears 131 and two idle gears 132. The two main gears 131 are respectively fixedly sleeved over the two corresponding spindles 110. The two idle gears 132 are meshed with each other and are respectively meshed with the two corresponding main gears 131, and axial directions A2 of the two main gears 131 are parallel to axial directions A3 of the two idle gears 132. The two main gears 131 and the two idle gears 132 are spur gears, that is, lines on each of the gears are straight.

A process of the hinge module 100 switching from a closed state to an unfolded state is described below with reference to FIG. 2A to FIG. 2C. First, when the hinge module 100 is in the closed state, the two brackets 120 are parallel to each other. Then, external force F is applied to one of the brackets 120 and drives one of the corresponding spindles 110 and one of the main gears 131 rotating in a first direction R1. A rotation switching function of the two idle gears 132 further drives the other spindle 110 and the other main gear 131 rotating in a second direction R2 opposite to the first direction R1, enabling the two spindles 110 to rotate in opposite directions and the two brackets 120 to be unfolded at 90 degrees and 180 degrees.

Figure 3A:
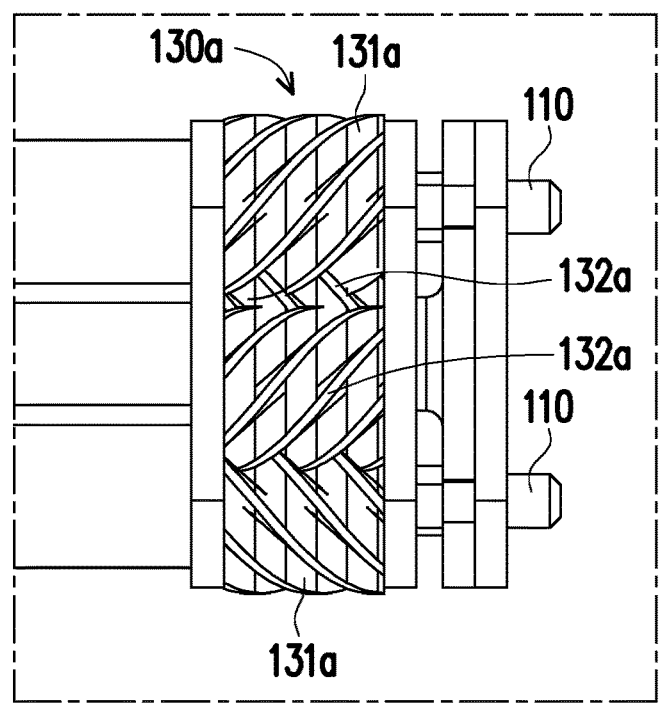
FIG. 3A is a plane view of a hinge module adopting another gear set according to another embodiment of the present invention.

FIG. 3A is a plane view of a hinge module adopting another gear set according to another embodiment of the present invention. Refer to FIG. 3A. In this embodiment, a gear set 130a includes two main gears 131a and two idle gears 132a. The two main gears 131a are respectively fixedly sleeved over the two spindles 110. The two idle gears 132a are meshed with each other and are respectively meshed with the two corresponding main gears 131a, and the two main gears 131a are parallel to the two idle gears 132a. The two main gears 131a and the two idle gears 132a are helical gears, that is, lines on each of the gears are helical.

Figure 3B:
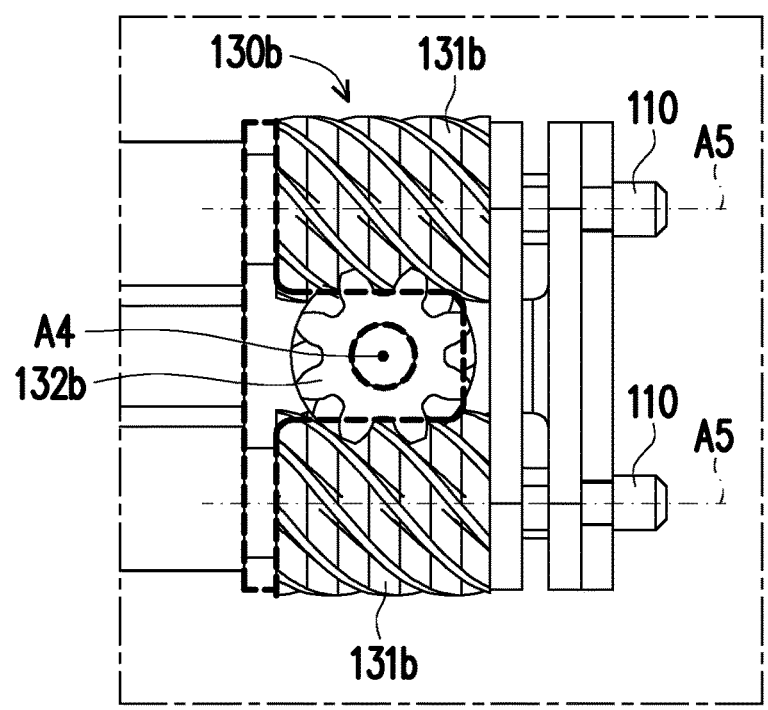
FIG. 3B is a plane view of a hinge module adopting still another gear set according to another embodiment of the present invention.

FIG. 3B is a plane view of a hinge module adopting still another gear set according to another embodiment of the present invention. Refer to FIG. 3B. In this embodiment, the gear set 130b includes two main gears 131b and an idle gear 132b. The main gears 131b are respectively fixedly sleeved over the two spindles 110. The idle gear 132b is meshed with the two main gears 131b, and an axial direction A4 of the idle gear 132b is perpendicular to an axial direction A5 of the two main gears 131b. The two main gears 131b and the idle gear 132b are helical gears, that is, lines on each of the gears are helical.

Figure 4:
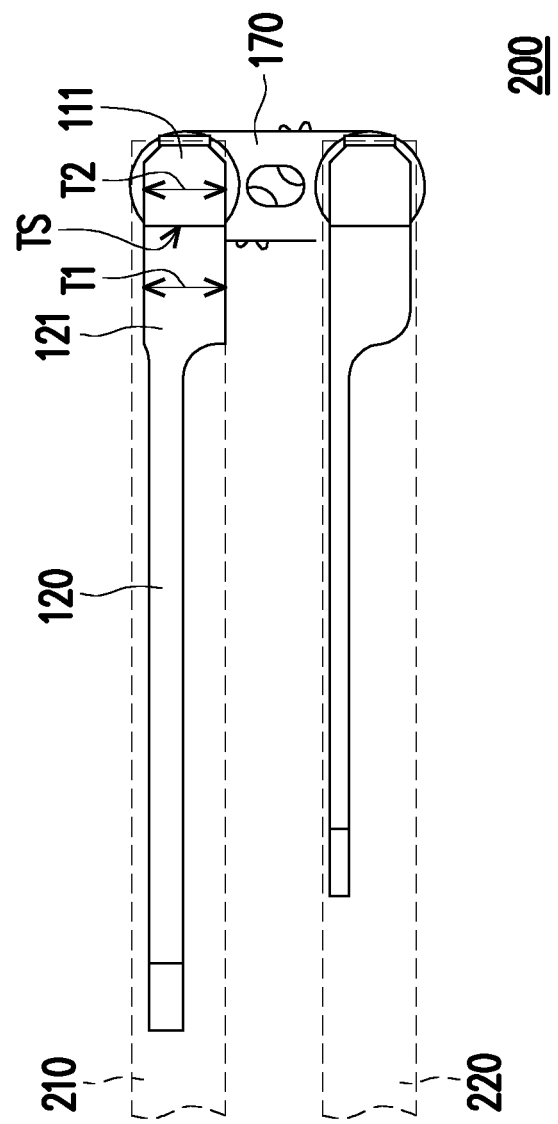
FIG. 4 is a side view of an electronic device according to an embodiment of the present invention.

FIG. 4 is a side view of an electronic device according to an embodiment of the present invention. Refer to FIG. 4 and FIG. 1A. In this embodiment, an electronic device 200 includes two bodies 210 and 220 and at least one hinge module 100 (there is one hinge module 100 in FIG. 4). For example, the electronic device 200 is a notebook computer, a tablet computer or and other similar products. In this embodiment, the two bodies 210 and 220 are respectively a host and a screen of the notebook computer and are respectively connected to the two brackets 120 of the hinge module 100, so that the two bodies 210 and 220 are adapted to switch between the unfolded state and the closed state by the hinge module 100.

Based on the above, the hinge module of the present invention is adapted to connect the two bodies, and in the present invention, the torque part is disposed between the gear set and the two brackets. When falling to the ground, the hinge module is impacted by an external force. Because there is a spacing between the two brackets, vibration with larger amplitude easily occurs and impact force is transferred outward along the spindles. In this case, the torque part neighboring to the two brackets absorbs most of the impact force, and only a small portion of the impact force is transferred to the gear set, thereby preventing the gear set from being damaged or even broken.

In addition, the existing bracket is sleeved over each of the spindles and has a large structural thickness, and an installing direction of the bracket coincides with an axial direction of each of the spindles. The installing direction of each of the brackets of the present invention is perpendicular to the axial direction of each of the spindles, that is, each of the brackets is connected to each of the spindles to achieve the lightweight and thin structure.

Although the present invention has been disclosed above through the embodiments, the embodiments are not intended to limit the present invention. Any person skilled in the art can make some variations or modifications without departing from the spirit and scope of the present invention. Therefore, the protection scope of the present invention shall be subject to the appended claims.

What is claimed is:

1. A hinge module, comprising:
two spindles, spaced apart from each other;
two brackets, respectively connected to a first side of the two spindles, wherein an installing direction of each of the brackets is perpendicular to an axial direction of each of the spindles;
a gear set, disposed at a second side opposite to the first side of the two spindles; and
a torque part, disposed on the two spindles and located between the brackets and the gear set, wherein each of the spindles comprises a mounting portion extending away from the torque part, and each of the brackets comprises a coupling portion connected to a contact surface of the mounting portion to connect the corresponding spindle and the bracket together,
wherein each of the mounting portions comprises a plurality of through holes, each of the coupling portions comprises a plurality of columns, and the columns are respectively passed through the through holes and riveted to the corresponding mounting portion, and an installing direction of each of the columns is perpendicular to forced directions of the brackets, each of the brackets is adapted to rotate relative to the torque part with the corresponding spindle, and the gear set is configured to drive the two spindles rotating in opposite directions.

2. The hinge module according to claim 1, wherein a first thickness of each of the coupling portions is not greater than a second thickness of each of the mounting portions.

3. The hinge module according to claim 1, further comprising a first baffle plate and a second baffle plate sleeved over the spindles and clamping the gear set, the first baffle plate is located on a side of the gear set close to the torque part, and the second baffle plate is located on another side of the gear set opposite to the first baffle plate.

4. The hinge module according to claim 1, further comprising a third baffle plate, wherein the third baffle plate is sleeved over the spindles and comprises a first stop block and a second stop block, each of the spindles comprises a positioning block, when the two brackets are closed relative to each other, the positioning blocks respectively abut against the first stop block and the second stop block, and when the two brackets are unfolded relative to each other, the positioning blocks separate the first stop block and the second stop block.

5. The hinge module according to claim 1, wherein the gear set comprises two main gears and two idle gears, the main gears are respectively fixedly sleeved over the spindles, the idle gears are meshed with each other and are respectively meshed with the corresponding main gears, and axial directions of the main gears are parallel to axial directions of the idle gears.

6. The hinge module according to claim 5, wherein the main gears and the idle gears are spur gears or helical gears.

7. The hinge module according to claim 1, wherein the gear set comprises two main gears and an idle gear, the main gears are respectively fixedly sleeved over the spindles, the idle gear is meshed with the main gears, and an axial direction of the idle gears is perpendicular to axial directions of the main gears.

8. The hinge module according to claim 7, wherein the main gears and the idle gear are helical gears.

9. An electronic device, comprising:
two bodies; and
at least one hinge module, disposed between the two bodies, and comprising:
two spindles, spaced apart from each other;
two brackets, respectively connected to a first side of the two spindles, wherein an installing direction of each of the brackets is perpendicular to an axial direction of each of the spindles, and the two bodies are respectively connected to the two brackets;
a gear set, disposed at a second side opposite to the first side of the two spindles; and
a torque part, disposed on the two spindles and located between the brackets and the gear set, wherein each of the spindles comprises a mounting portion extending away from the torque part, and each of the brackets comprises a coupling portion connected to a contact surface of the mounting portion to connect the corresponding spindle and the bracket together,
wherein each of the mounting portions comprises a plurality of through holes, each of the coupling portions comprises a plurality of columns, and the columns are respectively passed through the through holes and riveted to the corresponding mounting portion, and an installing direction of each of the columns is perpendicular to forced directions of the brackets, each of the brackets is adapted to rotate relative to the torque part with the corresponding spindle, and the gear set is configured to drive the two spindles rotating in opposite directions, so that the two bodies are unfolded relative to each other or closed relative to each other.

10. The electronic device according to claim 9, wherein a first thickness of each of the coupling portions is not greater than a second thickness of each of the mounting portions.

11. The electronic device according to claim 9, further comprising a first baffle plate and a second baffle plate sleeved over the spindles and clamping the gear set, the first baffle plate is located on a side of the gear set close to the torque part, and the second baffle plate is located on another side of the gear set opposite to the first baffle plate.

12. The electronic device according to claim 9, further comprising a third baffle plate, wherein the third baffle plate is sleeved over the spindles and comprises a first stop block and a second stop block, each of the spindles comprises a positioning block, when the two brackets are closed relative to each other, the positioning blocks respectively abut against the first stop block and the second stop block, and when the two brackets are unfolded relative to each other, the positioning block separates the first stop block and the second stop block.

13. The electronic device according to claim 9, wherein the gear set comprises two main gears and two idle gears, the main gears are respectively fixedly sleeved over the spindles, the idle gears are meshed with each other and are respectively meshed with the corresponding main gears, and axial directions of the main gears are parallel to axial directions of the idle gears.

14. The electronic device according to claim 13, wherein the main gears and the idle gears are spur gears or helical gears.

15. The electronic device according to claim 9, wherein the gear set comprises two main gears and an idle gear, the main gears are respectively fixedly sleeved over the spindles, the idle gear is meshed with the main gears, and an axial direction of the idle gear is perpendicular to axial directions of the main gears.

16. The electronic device according to claim 15, wherein the main gears and the idle gear are helical gears.

\* \* \* \* \*